Figure 1A:
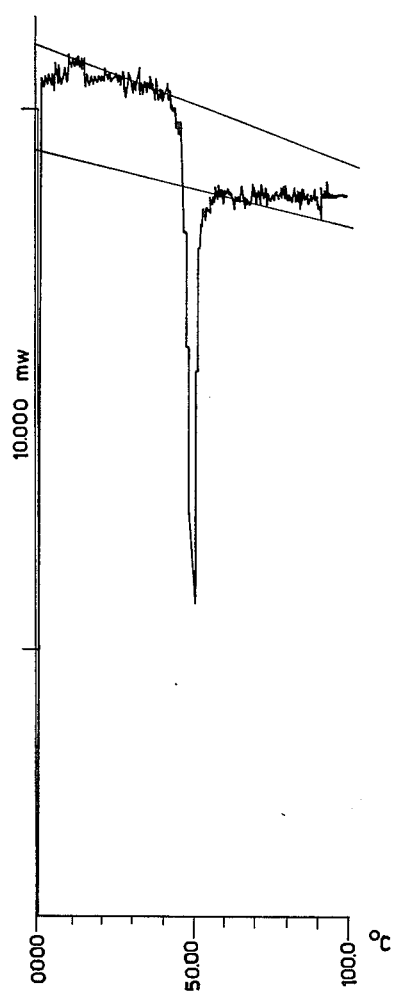

United States Patent [19]

Neri et al.

[11] Patent Number: 4,886,900

[45] Date of Patent: Dec. 12, 1989

[54] TETRAKIS(3-(3,5-DI-TERT.BUYL-4-HYDROXYPHENYL)PROPIONYL-OXYMETHYL) METHANE WITH AMORPHOUS STRUCTURE, PROCESS FOR ITS PREPARATION AND ITS USE AS A STABILIZER

[75] Inventors: Carlo Neri, San Donato Milanese; Nereo Nodari, Spino D'Adda; Giovanni Sandre, San Danato Milanese, all of Italy

[73] Assignee: Enichem Sintesi S.p.A., Palermo, Italy

[21] Appl. No.: 74,561

[22] Filed: Jul. 17, 1987

[30] Foreign Application Priority Data

Jul. 25, 1986 [IT] Italy .................................. 21258 A/86

[51] Int. Cl.$^4$ .............................................. C07C 69/76
[52] U.S. Cl. ..................................................... 560/75

[58] Field of Search .......................................... 560/75

[56] References Cited

U.S. PATENT DOCUMENTS 4,683,326 7/1987 Orban et al. ........................... 560/75

*Primary Examiner*—Paul J. Killos
*Attorney, Agent, or Firm*—Hedman, Gibson, Costigan & Hoare

[57] ABSTRACT

Tetrakis[3,5-di-tert.butyl-4-hydroxyphenyl)-propionyl-oxymethyl]methane with amorphous structure, with glass transition temperature $T_g$ comprised within the range of from about 40° C. to 50° C. and free from endothermic melting peaks at temperatures higher than 50° C. and of up to 200° C. is obtained by means of the melting of crystalline tetrakis[3-(3,5-di-tert.butyl-4-hydroxyphenul)-propionyl-oxymethyl]methane and sudden cooling of the molten material.

7 Claims, 7 Drawing Sheets

TETRAKIS(3-(3,5-DI-TERT.BUYL-4-HYDROXY-PHENYL)PROPIONYL-OXYMETHYL) METHANE WITH AMORPHOUS STRUCTURE, PROCESS FOR ITS PREPARATION AND ITS USE AS A STABILIZER

The present invention relates to tetrakis[3-(3,5-di-tert.butyl-4-hydroxyphenyl)-propionyl-oxymethyl]methane with amorphous structure, to the process for preparing it and to its use as a stabilizer, in particular for organic polymers.

Tetrakis[3-(3,5-di-tert.butyl-4-hydroxyphenyl)-propionyl-oxymethyl]methane is a compound having the formula:

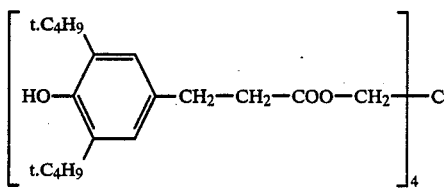

useful as a stabilizer for the organic materials, in particular the organic polymers, which undergo oxidative degradation due to the action of light and/or of heat, such as, e.g., disclosed in U.S. Pat. No. 3,644,428.

Furthermore, the commercial products of tetrakis[3-(3,5-di-tert.butyl-4-hydroxyphenyl)-propionyl-oxymethyl]-methane are known, such as, e.g., those marketed by Ciba-Geigy under the trade name Irganox ® 1010 and those sold by the Italian company Bozzetto under the trade name Anox ® 20.

The method generally used for the production of tetrakis[3-(3,5-di-tert.butyl-4-hydroxyphenyl)-propionyl-oxymethyl]-methane consists in transesterifying methyl and ethyl 3-(3,5-di-tert.butyl-4-hydroxyphenyl)-propionate

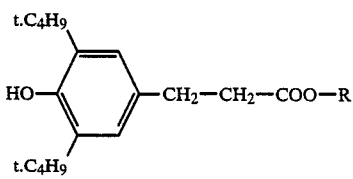

(wherein R is the methyl or ethyl group) with pentaerythritol, operating in the presence of a transesterification catalyst, as disclosed in the above cited U.S. Pat. No. 3,644,428.

Tetrakis[3-(3,5-di-tert.butyl-4-hydroxyphenyl)-propionyl-oxymethyl]methane, as obtained from the transesterification reaction, can be a glassy solid with a softening point of 50°–60° C., or a solid melting at 80°–90° C. They are mostly impure or coloured products, unacceptable on the market.

Hence, for the purpose of eliminating, or at least reducing the discoloration phenomena, it is usual in the art to resort to treatments of recrystallization from organic solvent, such treatments producing a crystalline tetrakis[3-(3,5-di-tert.butyl-4-hydroxyphenyl)-propionyl-oxymethyl]methane with a melting point of the order of 120° C. For such prior art reference is made to the specification of European patent No. 32,459, page 2.

In realty, the known commercial products tetrakis[3-(3,5-di-tert.butyl-4-hydroxyphenyl)-propionyl-oxymethyl]methane are crystalline solids, which can exist in various allotropic forms and which show melting temperatures within the range of from 110° to 125° C.

Finally, the above mentioned European Pat. No. 32,459 discloses a crystalline tetrakis[3-(3,5-di-tert.butyl-4-hydroxyphenyl)-propionyl-oxymethyl]methane, which shows a particular behaviour of X-ray diffraction, and a melting point of from 111° to 118° C.

The high melting point of tetrakis[3-(3,5-di-tert.butyl-4-hydroxyphenyl)-propionyl-oxymethyl]methane constitutes a problem as relates to the stabilization of the organic polymers in those applicative sectors wherein the polymer is processed at relatively low temperatures, as in case of blow moulding of high-density polyethylene, and in the processing of natural rubber.

In these cases, tetrakis[3-(3,5-di-tert.butyl-4-hydroxyphenyl)-propionyl-oxymethyl]-methane does not melt, and hence cannot perform its stabilizing action, or it melts only partially, generating problems of inhomogeneity of distribution, with the consequent formation of fragile regions in the end article obtained, due to the presence of segregated crystals.

It has found now that it is possible to obtain tetrakis[3-(3,5-di-tert.butyl-4-hydroxyphenyl)-propionyl-oxymethyl]methane with a amorphous structure, and with a low softening point, thus overcoming the drawbacks of the prior art as reported above.

Therefore, according to an aspect, the present invention relates to a process for the preparation of tetrakis[3-(3,5-di-tert.butyl-4-hydroxyphenyl)-propionyl-oxymethyl]methane with an amorphous structure, stable, and with low softening point, essentially consisting in melting crystalline tetrakis[3-(3,5-di-tert.butyl-4-hydroxyphenyl)-propionyl-oxymethyl]methane and solidifying the molten material by submitting it to a sudden cooling.

According to another aspect, the present invention relates to tetrakis[3-(3,5-di-tert.butyl-4-hydroxyphenyl)-propionyl-oxymethyl]methane with amorphous structure, characterized in that it shows a glass transition temperature ($T_g$) comprised within the range of from about 40° C. to 50° C. and is free from endothermic melting peaks at temperatures higher than 50° C. and of up to 200° C., said determinations being carried out by DSC (Differential Scanner Colorimetry), with said amorphous tetrakis[3-(3,5-di-tert.butyl-4-hydroxyphenyl)-propionyl-oxymethyl]-methane maintaining unchanged said characteristics during at least four heating and cooling cycles between the temperatures of −100° C. and +100° C. on DSC.

Furthermore, by the term "amorphous", it is herein meant that the tetrakis[3-(3,5-di-tert.butyl-4-hydroxyphenyl)-propionyl-oxymethyl]-methane according to the present invention does not show a diffraction spectrum on X-ray analysis, as carried out by means of a Philips powder goniometer, by using the CuKα radiation and a nickel filter.

The stability of the amorphous form of tetrakis[3-(3,5-di-tert.butyl-4-hydroxyphenyl)-propionyl-oxymethyl]-methane according to the present invention is confirmed by the fact that, when the values are measured of its viscosity within the temperature range of from 80 to 120° C., on a ROTOVISCO instrument (MV II 400 system, $\dot{\gamma}=57.6$), the values are typically obtained which are reported in the following Table:

| Temperature (°C.) | Viscosity (Pascal. sec) |
| --- | --- |
| 80 | 400.0 |
| 90 | 52.0 |
| 100 | 7.0 |
| 120 | 1.0 |

These measured viscosity values, besides demonstrating the stability of the amorphous form of tetrakis[3-(3,5-di-tert.butyl-4-hydroxyphenyl)-propionyl-oxymethyl]-methane according to the present invention, indicate the possibility of using it for the purpose of stabilizing the organic polymers which are processed at relatively low temperatures, such as, e.g., in the mastication of natural rubber, which is carried out at temperatures slightly higher than 60° C. Obviously, the amorphous tetrakis[3-(3,5-di-tert.butyl-4-hydroxyphenyl)-propionyl-oxymethyl]methane according to the present invention can be used for stabilizing any organic polymers against the oxidative degradation caused by light and/or heat, such as, e.g.: vinyl polymers, olefinic polymers, diolefinic polymers, polymeric alloys, ABS, etc.

Hence, according to another aspect, the present invention relates to stabilized polymeric compositions which comprise an organic polymer and a stabilizing amount of amorphous tetrakis[3-(3,5-di-tert.butyl-4-hydroxyphenyl)-propionyl-oxymethyl]methane according to the present invention.

A further aspect of the present invention consists in the preparation of amorphous tetrakis[3-(3,5-di-tert.butyl-4-hydroxyphenyl)-propionyl-oxymethyl]-methane, which consists essentially in heating crystalline tetrakis[3-(3,5-di-tert.butyl-4-hydroxyphenyl)-propionyl-oxymethyl]-methane above its melting point, and suddenly cooling the so-obtained molten material.

For the intended purpose, any crystalline tetrakis[3-(3,5-di-tert.butyl-4-hydroxyphenyl)-propionyl-oxymethyl]-methane with a melting point higher point higher than approximately 100° C., and generally comprised within the range of from 107° to 125° C., can be used.

A tetrakis[3-(3,5-di-tert.butyl-4-hydroxyphenyl)-propionyl-oxymethyl]-methane having such melting temperatures has a purity which is generally higher than 95% by weight.

The sudden cooling, suitable for causing a quick solidification of the molten material, can be obtained by any methods known in the art.

The preferred methods consist in pouring the molten material on a cold metal sheet, e.g., at a temperature equal to or lower than room temperature; in pouring the molten material into water or in another non-reactive, cold liquid, e.g., kept at room temperature or lower then room temperatures; in cooling the molten material as drops inside a gas (e.g., nitrogen), by a technique similar to the prilling technique.

These techniques make it possible to obtain, according to circumstances, tetrakis[3-(3,5-di-tert.butyl-4-hydroxyphenyl)-propionyl-oxymethyl]-methane as a solid body to be submitted to scaling and/or grinding, or as free-flowing granules having a desired size.

The following experimental examples are illustrative and not limitative of the purview of the present invention.

EXAMPLE 1

Crystalline tetrakis[3-(3,5-di-tert.butyl-4-hydroxyphenyl)-propionyl-oxymethyl]methane, a commerical product marketed under the trade name ANOX(R) 20 by Bozzetto (Italy) is used; it has a purity of 98.5% by weight, and a melting point of 122.5° C.

This product was obtained by transesterifying methyl 3-(3,5-di-tert.butyl-4-hydroxy-phenyl)-propionate with pentaerythritol, in the presence of a transesterification catalyst and crystallizing the raw reaction product from an organic solvent.

250 g of ANOX 20 is charged to a glass reactor of 1 l of capacity, equipped with mechanical stirrer, and with a jacket for enabling the circulation of the heating fluid.

By introducing oil into the jacket, the temperature is increased to 140° C., with the processed mass being kept stirred and under a nitrogen atmosphere. When the mass is completely molten, it is poured on an aluminum sheet of 50 x 50 cm, maintained at room temperature (20°-25° C.).

On the sheet a clear layer is formed, which solidifies to a glassy mass. When the mass is completely cooled, it is ground inside a mortar with a pestle, until a powder with an average paricle size of the order of 100-500 microns is obtained.

Thus, amorphous tetrakis[3-(3,5-di-tert.butyl-4-hydroxyphenyl)-propionyl-oxymethyl]-methane is obtained, which is submitted to the following checks:

DSC CHECK

The sample is sealed inside an aluminum capsule, and is introduced inside the sample-holder of the instrument (Mettler TA 3000 with Mettler TC 10 processor) and heated under nitrogen at the rate of 10° C./minute up to 100° C.; it is then kept at this temperature 15 minute long, and is finally cooled to −100° C. During the heating step, an endothermic peak is observed, which is centered at 48° C. (FIG. 1A); during the cooling step, such endothermic peak is observed at 39.1° C.

By repeating these heating and cooling operations three further times, the following values are respectively obtained for $T_g$: 47.6° C. (heating)

40.1° C. (cooling)
46.8° C. (heating)
40.0° C. (cooling)
48.2° C. (heating)
39.7° C. (cooling)

Figure 1B:
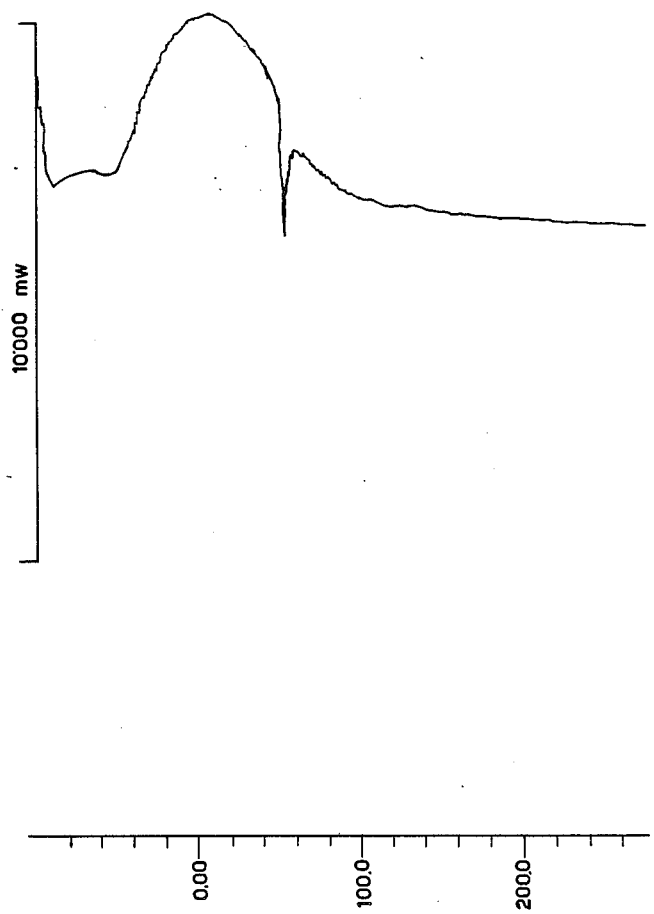

After the last cooling, the sample is heated again (20° C./minute) up to 200° C.; a $T_g$ is obtained of 47° C., without the appearance of other thermal phenomena within the scanned temperature range (FIG. 1B).

X-RAY CHECK

Figure 2:
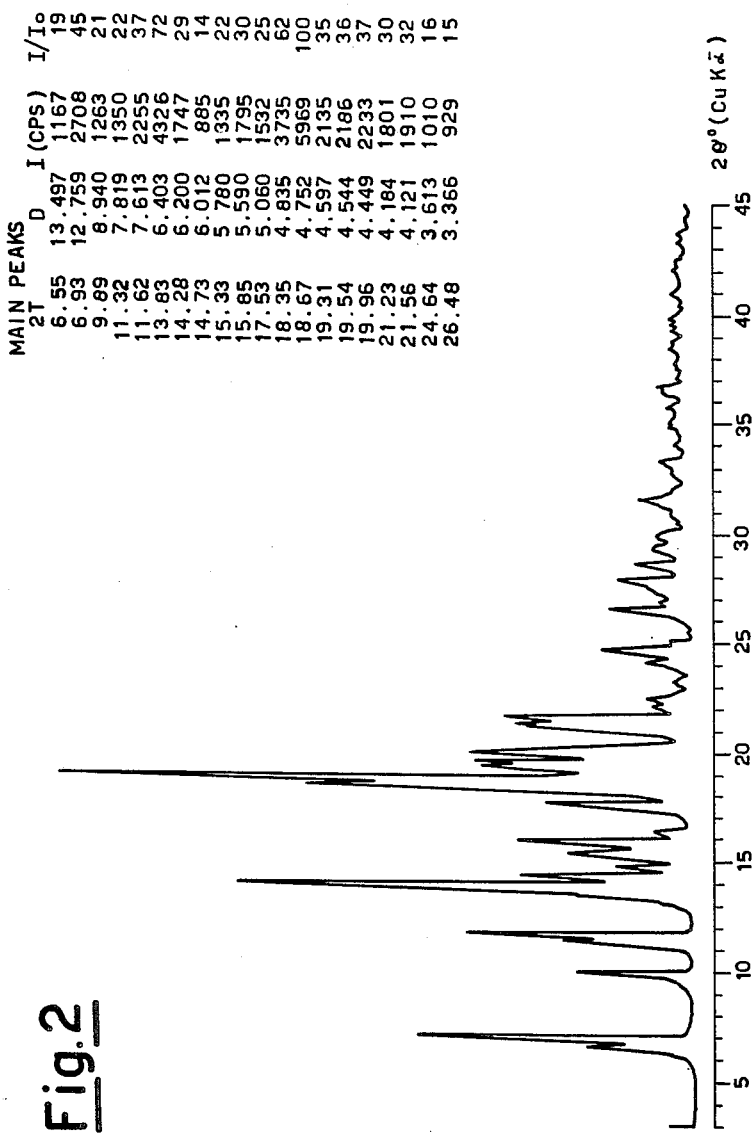
Figure 3:
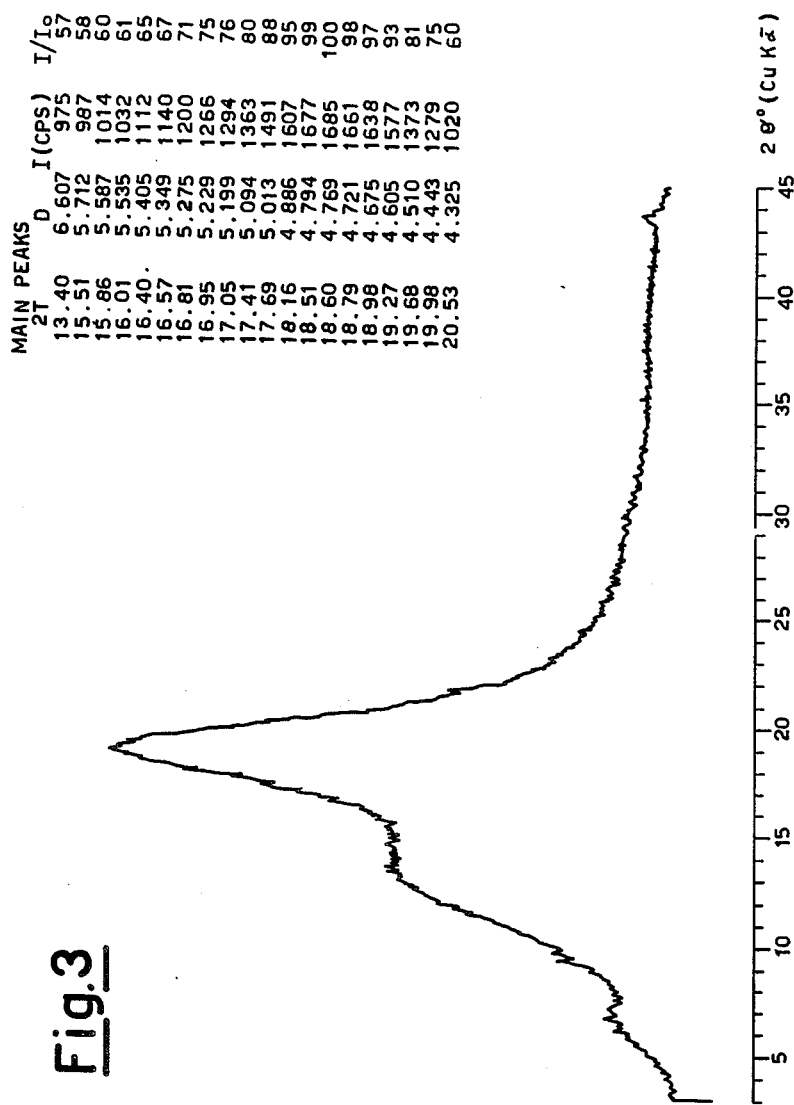

The ground sample is placed inside the sample holder of a Philips powder goniometer, and its diffraction spectrum is recorded by using the CuKα radiation; the recorded diffraction spectrum is shown in FIG. 3, whilst FIG. 2 shows the diffractogram of the crystalline product ANOX ® 20 before being treated.

IR-CHECK

The ground sample is pressed into tablets with KBr and its IR absorption spectrum is recorded. The IR absorption spectrum is reported in FIG. 4, wherein a lower resolution of the bands can be observed, relatively to those of the crystalline product ANOX ® 20 (FIG. 5); this lower resolution is typical of a not-organized system; the same hydroxy band results broader, with a component at 3500 cm$^{-1}$.

VISCOSITY CHECK

This check is carried out according to as reported in the disclosure, with similar results.

ANALYTICL CHECK BY HPLC (HIGH PRESSURE LIQUID CHROMATOGRAPHY

Figure 6:
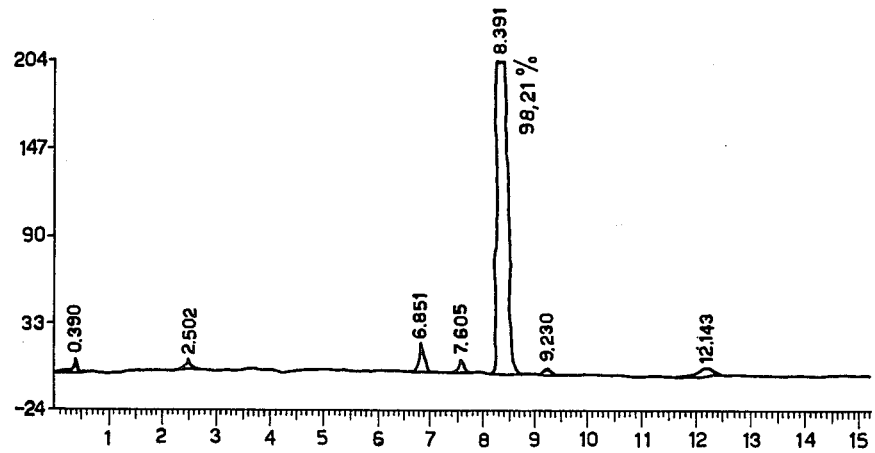
Figure 7:
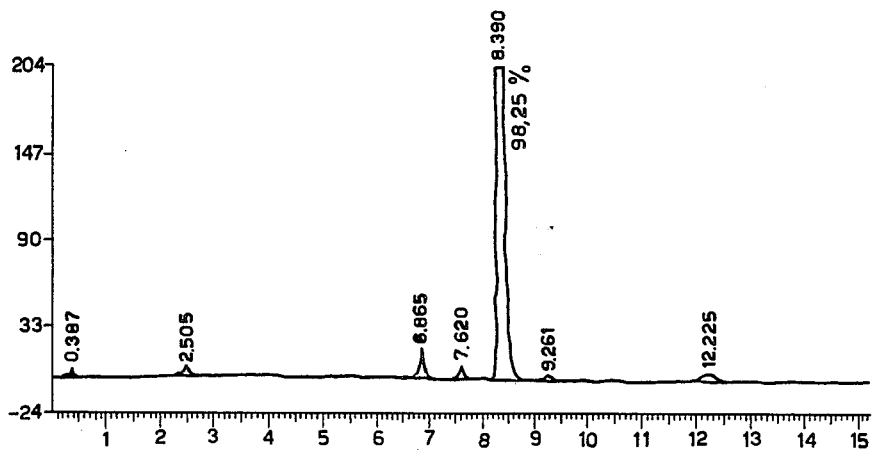

The titer of the sample results unchanged (98.2%) and no changes are observed in the distribution of the impurities present. In FIG. 6 the HPLC analysis of the crystalline product ANOX ® 20, and in FIG. 7 that of the corresponding amorphous sample is reported.

EXAMPLE 2

200 g of molten crystalline ANOX ® 20 at 140° C. is dropped through an electrically heated capillary (inner diameter 1 mm) into a glass container containing 2 litres of dionized water at room temperature (20°–25° C.).

Amorphous tetrakis[3-(3,5-di-tert.butyl-4-hydroxyphenyl)-propionyl-oxymethyl]methane is obtained as beads of about 5 mm of size.

This product is submitted to the characterizations as described in Example 1, and at all similar results are obtained.

EXAMPLE 3

200 g of molten crystalline ANOX ® 20 at 140° C. is dropped through an electrically heated capillary (inner diameter 1 mm) at the top of a glass tube 2 m long, and of 20 cm of diameter, filled with nitrogen gas, which is flown into the tube from its bottom, at a flowrate of 200 litre/hour.

At the tube bottom clear beads of about 3 mm of diameter, of amorphous tetrakis[3-(3,5-di-tert.butyl-4-hydroxyphenyl)-propionyl-oxymethyl]-methane are obtained.

This product is submitted to the same characterizations as described in Example 1, and at all similar results are obtained.

EXAMPLE 4

400 g of commercial polypropylene FLF 20, by Himont company, is mixed with 0.4 g of the commercial crystalline antioxidant ANOX ® 20 (0.1% by weight) on a planetary mixer and the blend is extruded seven times through a brabender extruder (D =19, L =25D, compression ratio 1:4, rpm =50, temperature profile 190/235/270/270). During the odd extrusions a portion of the granules was drawn and submitted to measurements of Melt-Flow Index (MFI) (190° C.; 2.16 kg) and Yellow Index (YI) on a Macbeth colorimeter.

The same operations are carried out by using 0.4 g of the amorphous compound obtained in Example 1.

The results of these tests are respectively reported in Tables 1 and 2.

TABLE 1

| Extrusion No. | 1 | 3 | 5 | 7 |
|---|---|---|---|---|
| MFI | 5.87 | 7.54 | 9.04 | 10.78 |
| YI | −0.75 | 2.69 | 3.86 | 7.59 |

TABLE 2

| Extrusion No. | 1 | 3 | 5 | 7 |
|---|---|---|---|---|
| MFI | 5.57 | 7.18 | 8.69 | 10.28 |
| YI | −2.23 | 1.11 | 4.09 | 7.40 |

It can be stated that the two test sets gave the same results within the limits of the experimental error.

That fact demonstrates that the amorphous form of the stabilizer does not jeopardize its stabilizing characteristics.

We claim:

1. The compound:
Tetrakis(3-(3,5-di-tert.butyl-4-hydroxyphenyl)-propionyl-oxymethyl)methane having an amorphour structure, a glass transition temperature of from about 40° C. to 50° C. and no endothermic melting peaks at temperatures from 50° C. to 200° C., said amorphous tetrakis(3-(3,5-di-tert.butyl-4-hydroxyphenyl)-propionyl-oxymethyl)methane maintaining unchanged said characteristics during at least four heating and cooling cycles between −100° C. and +100° C.

Figure 4:
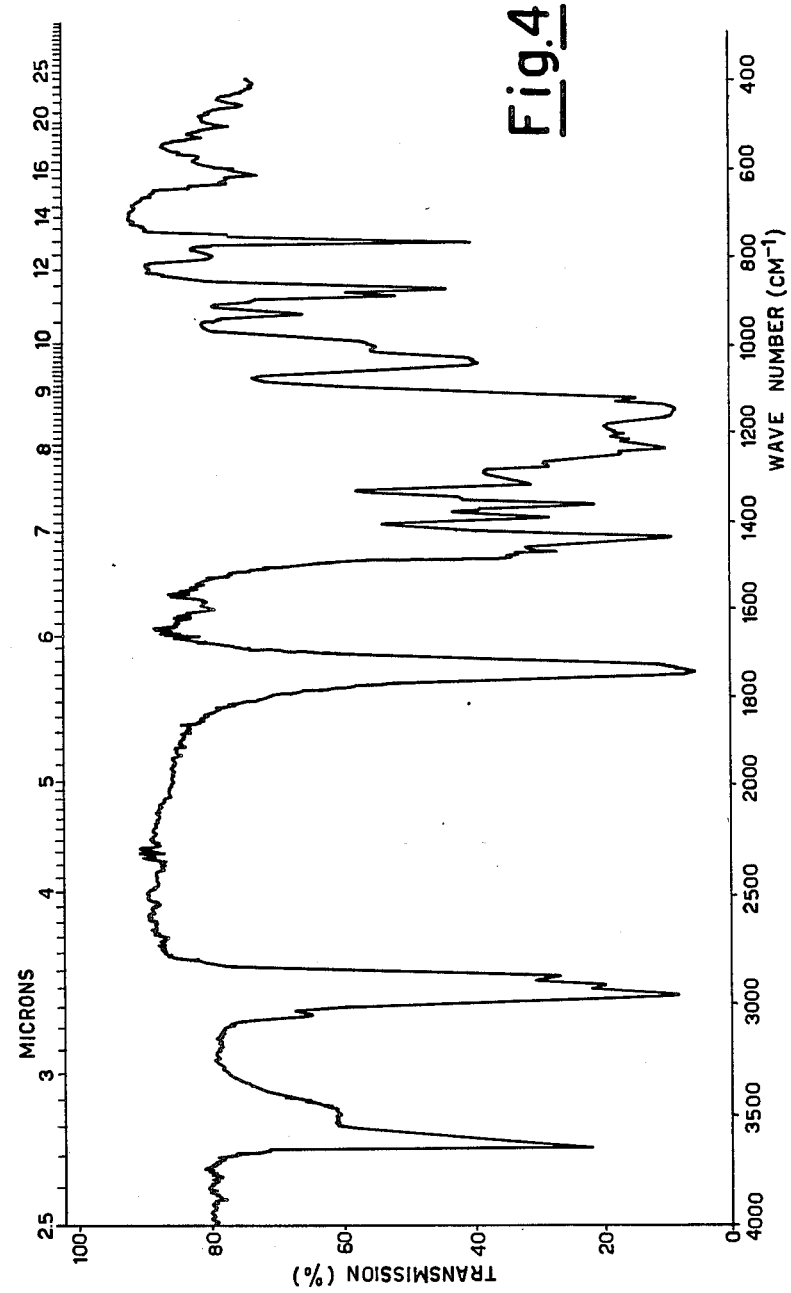
Figure 5:
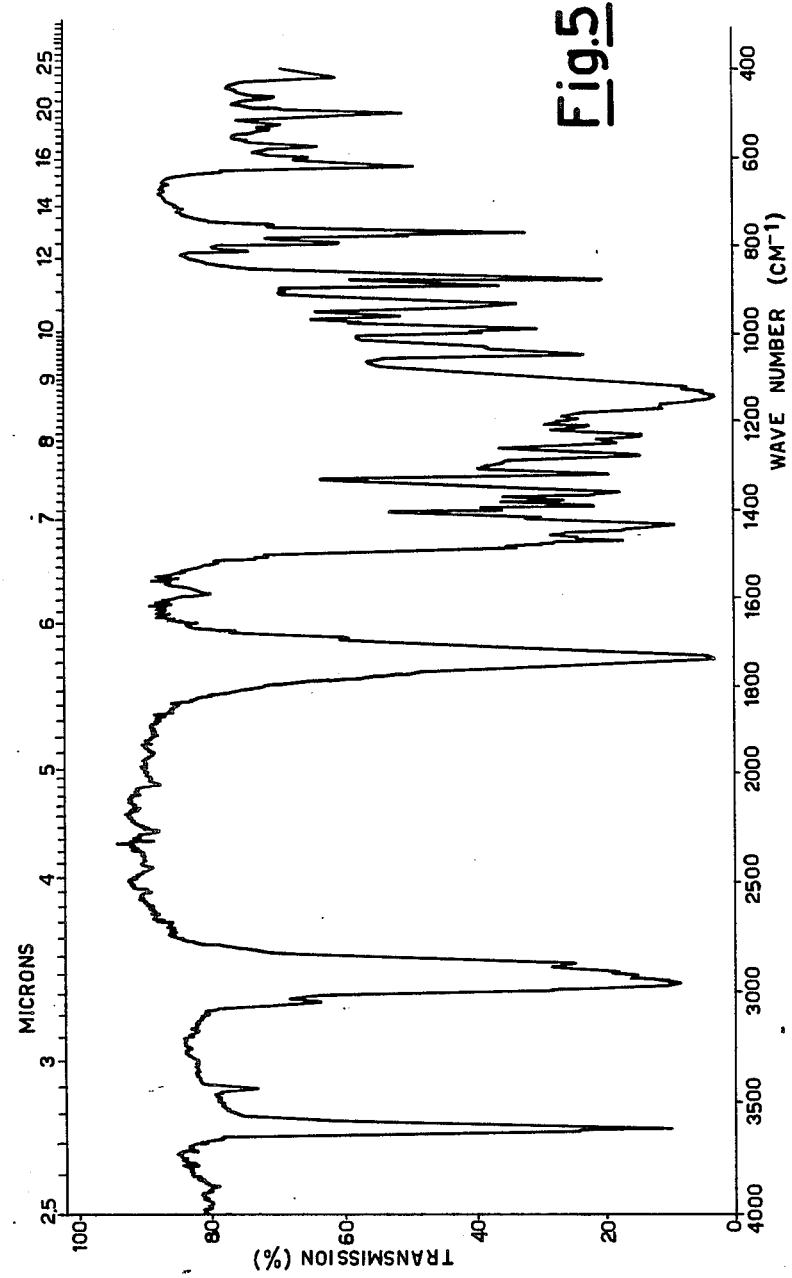

2. The compound according to claim 1 wherein said tetrakis(3-(3,5-di-tert.butyl-4-hydroxyphenyl)-propionyl-oxymethyl)methane exhibits a X-ray spectrum as follows:

| | MAIN PEAKS | | |
|---|---|---|---|
| 2T | D | I (CPS) | I/I$_o$ |
| 13.40 | 6.607 | 975 | 57 |
| 15.51 | 5.712 | 987 | 58 |
| 15.86 | 5.587 | 1014 | 60 |
| 16.01 | 5.535 | 1032 | 61 |
| 16.40 | 5.405 | 1112 | 65 |
| 16.57 | 5.349 | 1140 | 67 |
| 16.81 | 5.275 | 1200 | 71 |
| 16.95 | 5.229 | 1266 | 75 |
| 17.05 | 5.199 | 1294 | 76 |
| 17.41 | 5.094 | 1363 | 80 |
| 17.69 | 5.013 | 1491 | 88 |
| 18.16 | 4.886 | 1607 | 95 |
| 18.51 | 4.794 | 1677 | 99 |
| 18.60 | 4.769 | 1685 | 100 |
| 18.79 | 4.721 | 1661 | 98 |
| 18.98 | 4.675 | 1638 | 97 |
| 19.27 | 4.605 | 1577 | 93 |
| 19.68 | 4.510 | 1373 | 81 |
| 19.98 | 4.443 | 1279 | 75 |
| 20.53 | 4.325 | 1020 | 60 | and an IR spectrum, as reported in FIG. 4.

3. Process for amorphous tetrakis(3-(3,5-di-tert.butyl-4-hydroxyphenyl)-propionyl-oxymethyl)-methane having a glass transition temperature from about 40° C. to 50° C. and no endothermic melting peaks at temperatures from about 50° C. to 200° C., said amorphous tetrakis(3-(3,5-di-tert.butyl-4-hydroxyphenyl)-propionyl-oxymethyl)-methane maintaining unchanged said characteristics during at least four heating and cooling cycles between −100° C. and +100° C. and exhibiting a X-ray spectrum as follows:

| | MAIN PEAKS | | |
|---|---|---|---|
| 2T | D | I (CPS) | I/I$_o$ |
| 13.40 | 6.607 | 975 | 57 |
| 15.51 | 5.712 | 987 | 58 |
| 15.86 | 5.587 | 1014 | 60 |
| 16.01 | 5.535 | 1032 | 61 |
| 16.40 | 5.405 | 1112 | 65 |
| 16.57 | 5.349 | 1140 | 67 |
| 16.81 | 5.275 | 1200 | 71 |
| 16.95 | 5.229 | 1266 | 75 |
| 17.05 | 5.199 | 1294 | 76 |
| 17.41 | 5.094 | 1363 | 80 |
| 17.69 | 5.013 | 1491 | 88 |
| 18.16 | 4.886 | 1607 | 95 |
| 18.51 | 4.794 | 1677 | 99 |

-continued

| MAIN PEAKS | | | |
|---|---|---|---|
| 2T | D | I (CPS) | $I/I_o$ |
| 18.60 | 4.769 | 1685 | 100 |
| 18.79 | 4.721 | 1661 | 98 |
| 18.98 | 4.675 | 1638 | 97 |
| 19.27 | 4.605 | 1577 | 93 |
| 19.68 | 4.510 | 1373 | 81 |
| 19.98 | 4.443 | 1279 | 75 |
| 20.53 | 4.325 | 1020 | 60 | and an IR spectrum, as reported in FIG. 4, said process comprising:

melting crystalline tetrakis(3-(3,5-di-tert.butyl-4-hydroxyphenyl)-propionyl-oxymethyl)methane into a molten material; and
solidifying said molten material by sudden cooling.
solidifying said molten material by sudden cooling.

4. The process according to claim 3, wherein said sudden cooling is accomplished by pouring said molten material on a cold metal sheet.

5. The process according to claim 3, wherein said sudden cooling is accomplished by pouring said molten material into water.

6. The process according to claim 3, wherein said sudden cooling is accomplished by contacting said molten material as drops with a gas.

7. Stabilized polymeric compositions comprising an organic polymer and a stabilizing amount of an amorphous tetrakis-3-(3,5-di-tert.butyl-4-hydroxyphenyl)-propionyl-oxymethyl)-methane having a glass transition temperature from about 40° C. to 50° C. and no endothermic melting peaks at temperatures from about 50° C. to 200° C., said amorphous tetrakis(3-(3,5-di-tert.butyl-4-hydroxyphenyl)-propionyl-oxymethyl)-methane maintaining unchanged said characteristics during at least four heating and cooling cycles between −100° C. and +100° C. and exhibiting a X-ray spectrum as follows:

| MAIN PEAKS | | | |
|---|---|---|---|
| 2T | D | I (CPS) | $I/I_o$ |
| 13.40 | 6.607 | 975 | 57 |
| 15.51 | 5.712 | 987 | 58 |
| 15.86 | 5.587 | 1014 | 60 |
| 16.01 | 5.535 | 1032 | 61 |
| 16.40 | 5.405 | 1112 | 65 |
| 16.57 | 5.349 | 1140 | 67 |
| 16.81 | 5.275 | 1200 | 71 |
| 16.95 | 5.229 | 1266 | 75 |
| 17.05 | 5.199 | 1294 | 76 |
| 17.41 | 5.094 | 1363 | 80 |
| 17.69 | 5.013 | 1491 | 88 |
| 18.16 | 4.886 | 1607 | 95 |
| 18.51 | 4.794 | 1677 | 99 |
| 18.60 | 4.769 | 1685 | 100 |
| 18.79 | 4.721 | 1661 | 98 |
| 18.98 | 4.675 | 1638 | 97 |
| 19.27 | 4.605 | 1577 | 93 |
| 19.68 | 4.510 | 1373 | 81 |
| 19.98 | 4.443 | 1279 | 75 |
| 20.53 | 4.325 | 1020 | 60 | and an IR spectrum, as reported in FIG. 4.

* * * * *